July 17, 1951  V. C. V. WEYANT  2,560,754
MEASUREMENT AND ACTUATION DEVICE
Filed Nov. 13, 1946  6 Sheets-Sheet 1

INVENTOR
VALONE V. WEYANT

BY Oldham & Oldham

ATTORNEYS

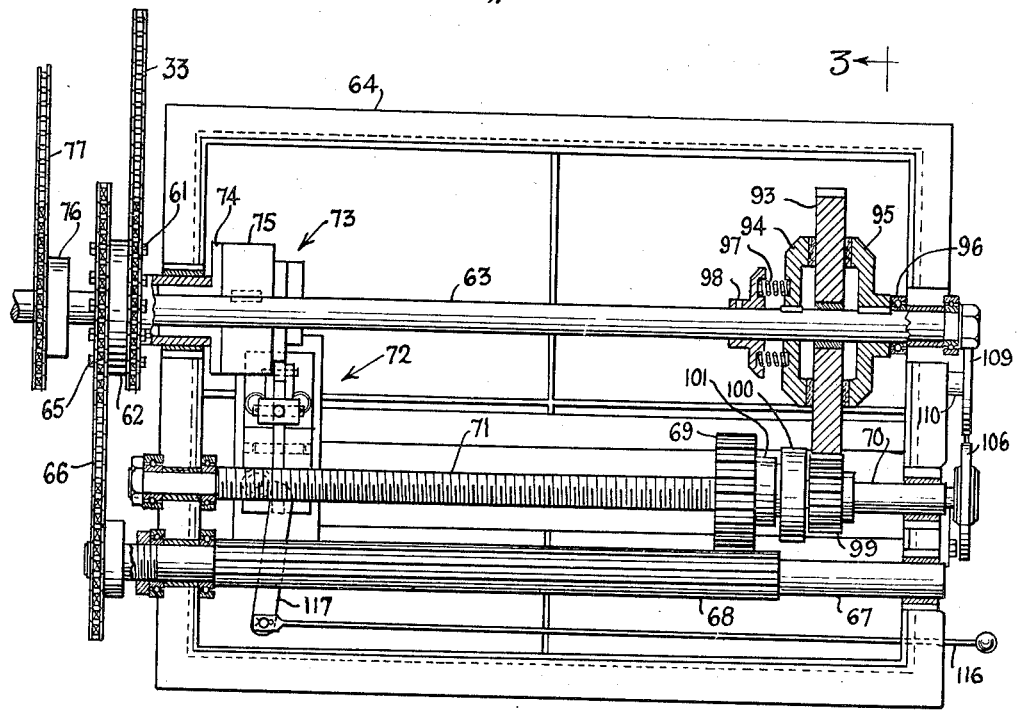

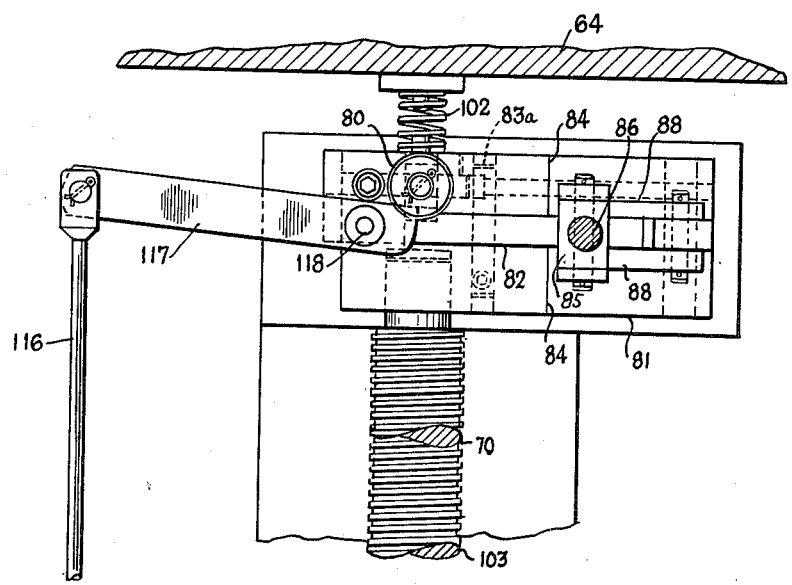

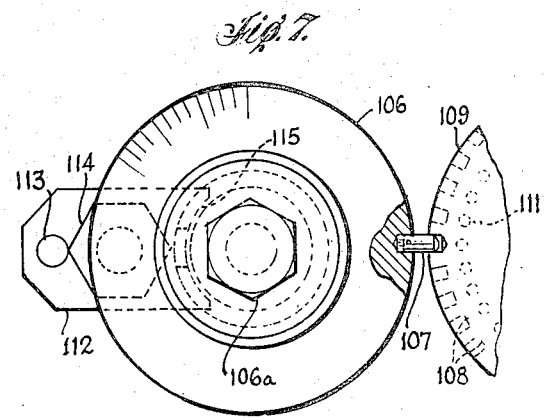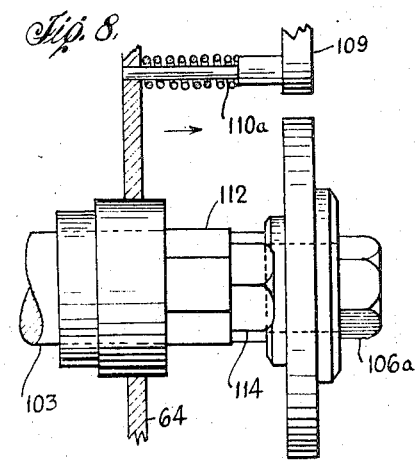

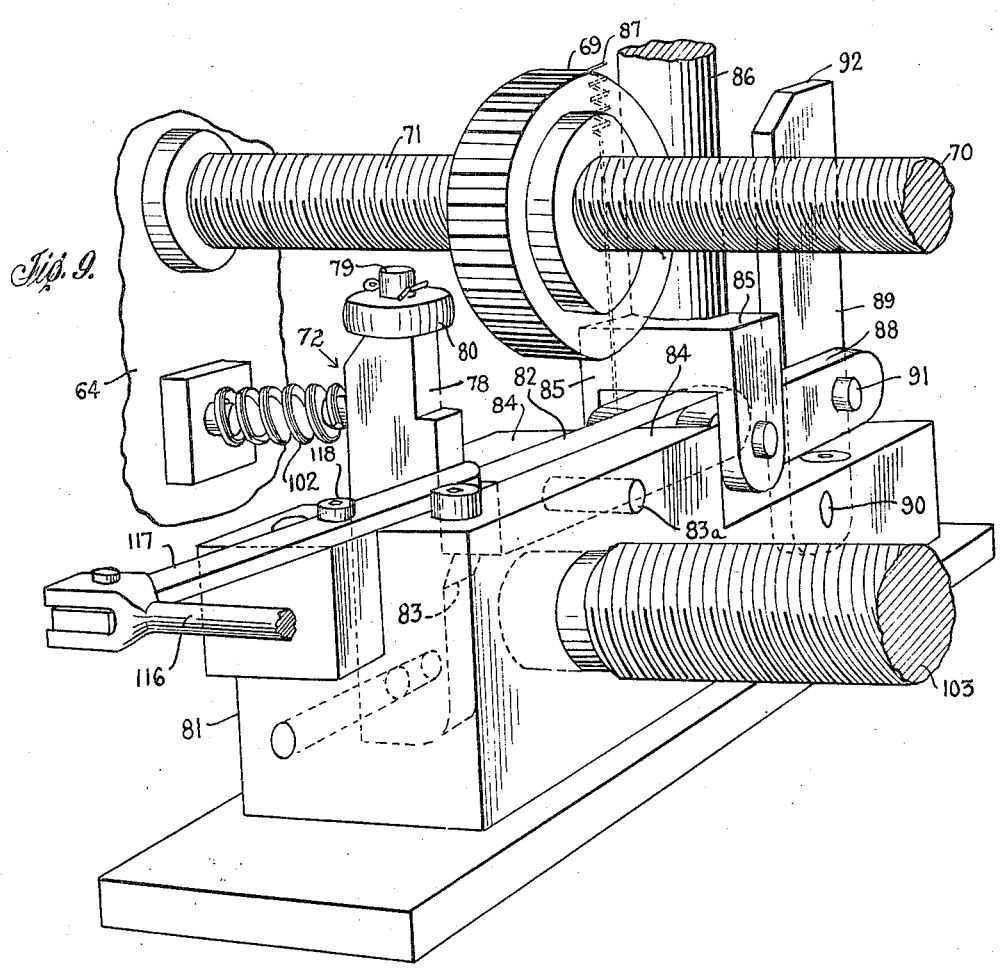

Patented July 17, 1951

2,560,754

UNITED STATES PATENT OFFICE 2,560,754

MEASUREMENT AND ACTUATION DEVICE

Valone C. V. Weyant, Cleveland, Ohio, assignor to The Yoder Co., Cleveland, Ohio, a corporation of Ohio Application November 13, 1946, Serial No. 709,577

22 Claims. (Cl. 74—125.5)

This invention relates to measurement and actuation devices, especially to a cyclic machine which is adapted to measure continuous or interrupted motion or movement of one member and then automatically connect, or actuate a second member when the first member has moved through a pre-determined length, after which the machine will automatically reset itself for another cycle of operation.

The general object of this invention is to provide a machine which will automatically perform a function when an input member has transmitted a predetermined amount of motion to the machine.

Another object of this invention is to provide a measuring and actuation device that is characterized by its accurate and positive operation.

Another object of the invention is to provide a compact, sturdy measuring machine adapted to function for continuous periods with a minimum of maintenance.

Another object of the invention is to provide an automatic measuring and actuation device which is entirely operated by mechanical elements.

Yet another object of the invention is to provide an effective, adjustable means for use in measuring repetitive intervals or lengths of input motion.

Further and more limited objects of the invention are to provide an automatic measuring machine adapted to measure continuous or intermittent motion; to provide a finely calibrated, easily operated adjustment for varying the amount of the input motion to the machine required to actuate same; to make the machine adjustable while it is operating; to provide a novel resetting mechanism for the measuring device; and to provide a manual control for actuating the machine at any desired time.

The foregoing, and other objects and advantages of the invention, are achieved, broadly speaking, by the provision of a driven input member, movable means engaged with the input member for measuring and accumulating movement of the input member, an output member, means for driving the output member, a clutch for connecting the output member to its driving means with the clutch being engaged by action of the movable means in being moved to a predetermined point by the input member, means for returning the movable means to its starting position, and means for disengaging the clutch on predetermined movement on the output member.

Reference is now made to the accompanying drawings, wherein:

Fig. 2 is a plan, partly in section, of the machine with its cover removed;

Fig. 3 is a vertical section on line 3—3 of Fig. 2;

Fig. 6 is a plan of the device of Fig. 4;

Fig. 7 is a fragmentary elevation of the indicator means of the invention;

Fig. 8 is a side elevation of the means of Fig. 7; and

Fig. 9 is a perspective view of the clutch control means of Fig. 4.

Figure 1:
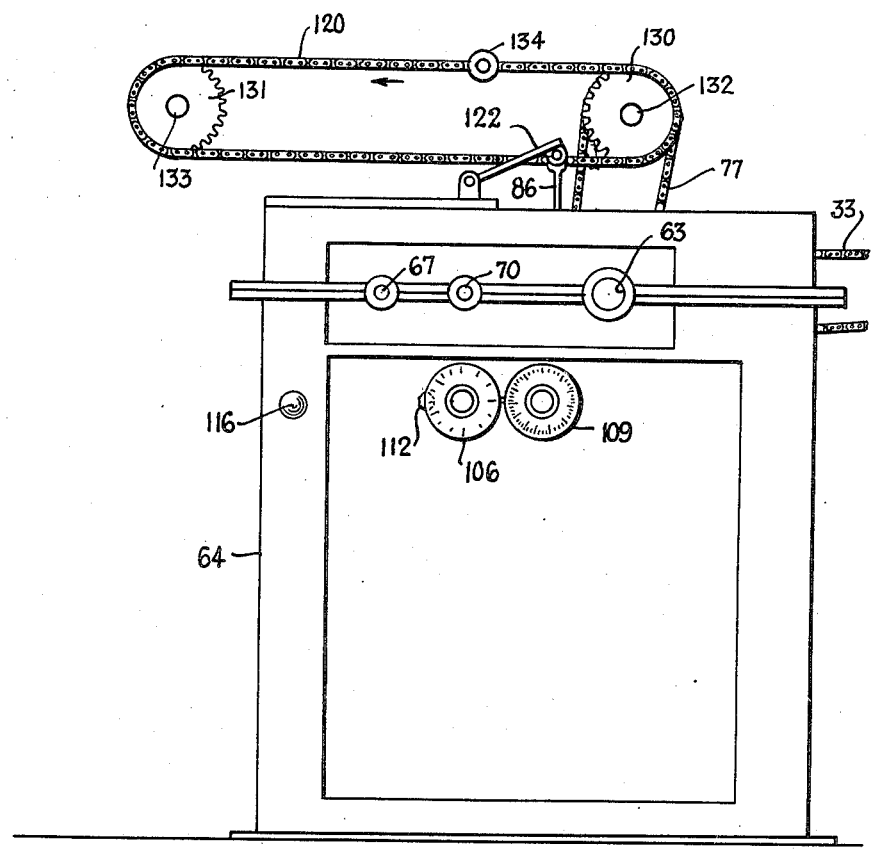
Fig. 1 is an elevation of a measurement and actuation machine embodying the principles of my invention.
Figure 5:
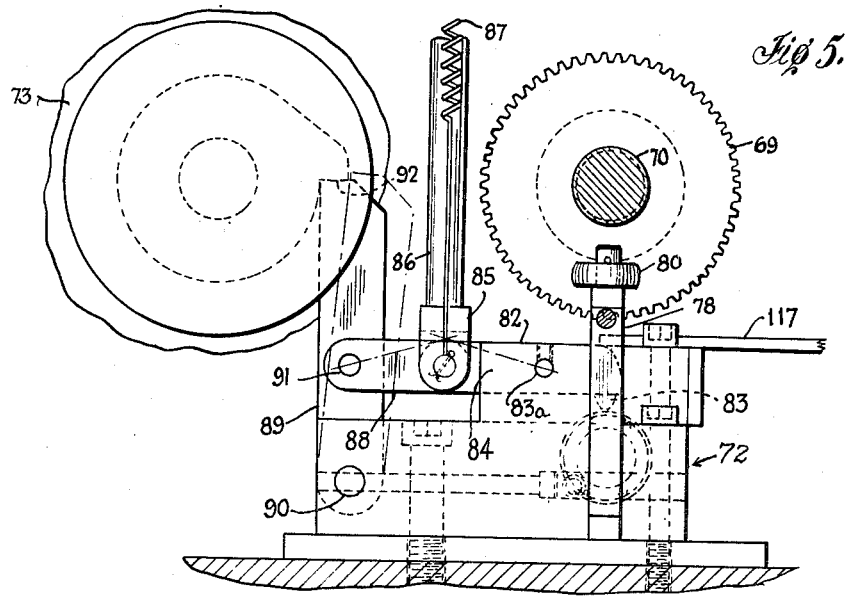
Fig. 5 is a side elevation of the device of Fig. 4.
Figure 4:
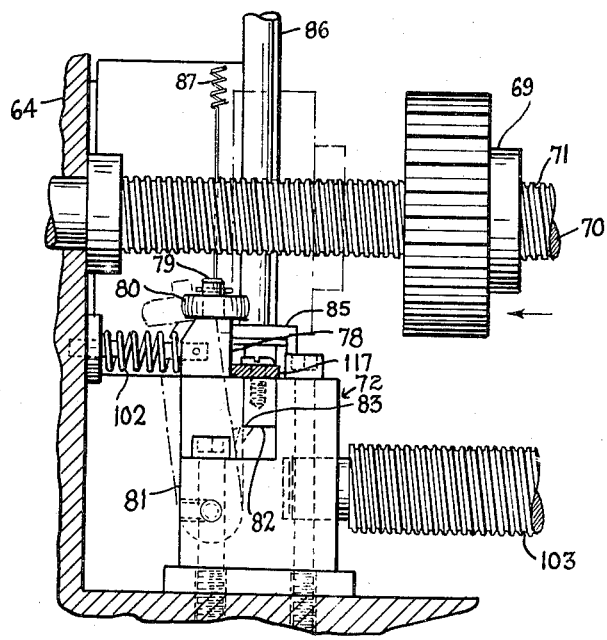
Fig. 4 is a fragmentary detail elevation of the clutch actuation device of the invention with the gear nut in its advanced position.

Now referring in detail to the drawings, a driven input member which in this instance comprises a chain 33, the movement of which is to be measured and which is to effect another operation at regular intervals of its movement, transmits drive to a sprocket 61 that is suitably secured to a hub bushing 62 on a clutch or output shaft 63 which in turn is journalled adjacent its ends, in a conventional manner, by a gear box, frame, or housing 64. The gear box 64 receives the measuring means therein. A sprocket 65 is also secured to the hub bushing 62 and it engages with a chain 66 that extends around a sprocket that is carried by a pinion shaft 67 which is journalled at its ends in the gear box 64.

From the foregoing, it will be seen that the shaft 67 will be rotated whenever the input member (chain 33) is moving. The shaft 67 has a pinion gear 68 formed thereon for substantially its entire length and such gear 68 engages with a pinion gear nut 69 that in turn is carried by a control shaft 70 which is suitably journalled in the gear box 64. The shaft 70 has threads 71 cut thereon which engage with threads (not shown) tapped into the bore of the gear nut 69. Thus the gear nut 69 will be rotated by the pinion gear 68 and such rotation will normally advance the gear nut along the shaft 70 from the right to the left (Fig. 2). The gear nut 69 then is adapted to engage with and actuate lock means 72 that in turn controls operation of a single revolution type clutch, indicated generally at 73, which clutch is carried by the shaft 63. The driving section 74 of the clutch 73 is secured to the hub bushing 62 while the other, or driven clutch section 75 is secured to the clutch shaft 63. Hence when the clutch 73 is engaged, the shaft 63 is driven by the chain 33 and a sprocket 76, carried by the shaft 63 at its end, engages with a chain 77 which is the output member of the device of the invention and transmits drive to any desired means.

The aforementioned action all is controlled by the gear nut 69 and its actuation of the lock means 72. This novel lock of the invention (see Figs. 4 to 6 and 9) comprises a vertically extending latch hook 78 that has a pin 79 extending upwardly from its upper end and which journals a roller 80 thereon. The latch hook 78 is pivotally carried by a block 81 which is secured to the gear box 64. The roller 80 is in the path of the gear nut 69 as it is moved axially of the shaft to approach the end of the shaft 70 and the gear nut 69 will force the latch hook 78 against a compression spring 102 to pivot towards the adjacent wall of the gear box. The spring 102 must be compressed by the latch hook 78 and a feature of the invention is that the spring 102 is quite stiff so that a substantial force is required to move the latch hook 78. The force required is sufficient to "take up" any slack or lost motion which may be present between the many parts of the measuring device. Thus the spring provides a means for automatically compensating for any looseness between the moving parts caused by or incident to wear. The spring 102 will force the gear nut 69 rearwardly of the threads 71 before the gear nut actuates the latch hook 78 so that the motion being measured by movement of the gear nut on the threads 71 can accurately be measured since the gear nut can be placed in its rearmost engagement with the threads 71 for both the starting and actuating position of the gear nut on the threads. Continued action or movement of the latch hook 78 releases a clutch tripping latch 82 that normally is supported by a narrow shoulder 83 formed on the latch hook 78. The clutch tripping latch 82 is shown as being pivotally supported intermediate its ends on a pin 83a that is journalled between a pair of spaced upwardly directed shoulders 84 formed on the block 81. The free end of the clutch tripping latch 82 is in turn pivotally secured to a clevis 85 which is carried by a reset rod 86 which is positioned in the gear box for limited vertical movement as will hereinafter be explained. A spring 87 is secured to the clevis 85 in a conventional manner and it is also secured (not shown) to the upper part of the gear box 64 so that the reset rod 86 will automatically move upwardly of the gear box when the clutch tripping latch 82 is released from the latch hook 78.

To control the action of the clutch 73, the clevis 85 also connects to a pair of links 88 that connect to a clutch tripping dog 89 which is pivotally carried by a pin 90 journalled in the block 81. A pin 91 pivotally connects ends of the links 88 to the clutch tripping dog 89 intermediate its ends, as shown in Fig. 9. The clutch 73 is of conventional construction and is of the type adapted to be operated by an external control. Thus the clutch 73 has a shoulder 92 formed thereon which engages or disengages the clutch dependent upon whether or not the shoulder 92 is free to move, or is held against motion, respectively. The dog 89 normally is engaged with the shoulder 92 but the upward movement of the reset rod 86 will move the dog 89 about an arc centered on the pin 90 and will engage the clutch 73 to cause the shaft 63 to drive the chain 77.

The measuring and actuating means of the invention are reset for a new measuring action by suitable devices such as a gear 93 that is rotatably journalled on the shaft 63. Conventional clutch plates 94 and 95 are secured to the shaft 63 and are positioned on opposite sides of the gear 93 with the plate 95 being held against lateral movement by a bearing 96 between it and the gear box 64 and with a plurality of coil springs 97 being compressed between a collar 98, secured to the shaft 63, and the clutch plate 94. The plates 94 and 95 have conventional clutch facings, preferably of metal, thereon so that they will releasably drive the gear 93 whenever the shaft 63 rotates. The gear 93 is of relatively large diameter, as shown, and it engages a relatively small diameter gear 99 which is secured to the shaft 70. A stop member 100 is positioned about the shaft 70 intermediate the gear nut 69 and the gear 99 and a suitable thrust bearing 101 is positioned between the stop 100 and the gear nut 69. Thus when the shaft 63 rotates, the gear 93 is so designed and arranged as to drive the gear 99, and hence the shaft 70, in a direction and at such a greater speed than the pinion gear 68 is driving the gear nut 69 that the gear nut 69 is brought back to bear against the stop member 100 due to the threaded engagement of the gear nut 69 and shaft 70. The initial return movement of the gear nut 69 frees the lock means 72 for resetting which is effected by downward movement, as hereinafter explained, of the reset rod 86 that in turn causes the lock end of the clutch tripping latch 82 to move above the shoulder 83 on the latch hook 78. As indicated, the compression spring 102 is secured between the gear box 64 and the free end of the latch hook 78 so as to urge it back to and retain it at latch position whenever the clutch tripping latch 82 is moved as to permit lock action by the latch hook 78.

In returning the gear nut 69 to its starting position wherein it is abutted on the stop member 100, the gear 93 first moves at least at substantially the same rotational speed as the shaft 63 and this effects a rapid relocation of the gear nut. To retain the gear nut 69 at its zero position, the gear 93 slips appreciably with relation to shaft 63 but the clutch plates 94 and 95 are urged into engagement with the gear 93 so as to rotate it and thereby the shaft 70 at a sufficient speed that the gear nut 69 will be retained against the stop 100 against the action of the threads 71 and pinion gear 68 which attempt to move the gear nut axially towards the left on shaft 70.

Yet another feature of the invention is that the stop member 100 can be moved along and retained at a given location axially of the shaft 70 to cause the device of the invention to operate for different amounts of input motion. For this function, a threaded shaft 103 is journalled in the gear box 64 and block 81 below the shaft 70 and a nut block 104 is engaged with the shaft 103. This nut block 104 carries the stop member 100 by a pair of bars 105 secured therebetween. Thus as the nut block 104 is moved along the shaft 103 by rotation thereof, the stop member 100 is correspondingly moved along the shaft 70 to limit axial movement of the gear nut 69 along the shaft 70 and to prevent its disengagement from the threads 71.

Preferably, indicator means (Figs. 7 and 8) are provided to correlate the position of the nut block and stop member with the input movement required to move the gear nut from its zero to its lock release position. These means are shown as an inch indicator dial 106 that is carried by the shaft 103 at an end thereof that protrudes through the gear box 64. The dial 106 carries a dial engaging pin 107 that extends radially from an edge thereof and engages with one of a number of radially directed recesses 108 formed in the edge of a second, or foot indicator dial 109 that is secured to a stub shaft 110 journalled in the gear box 64. The pin 107 is adapted to move the dial 109 through such an arc that the pin will engage the next adjacent recess 108 each time the dial 106 is revolved so that the dial 109 will in turn be moved through one step or arc of a circle. A lock pin 110a may be resiliently urged against and engage with recesses 111 in the rear face of the dial 109 to retain it in a given position.

Then, by suitably calibrating the dials 106 and 109, the stop member 100 can be set to cause my novel measuring and actuating device to function for any desired length of input motion within the physical limits of the apparatus. In this instance, one rotation of the dial 106 equals one foot and each notch or recess 108 equals one foot of motion of the chain 33.

The dial 106 preferably is locked in a given position and a clamp dog 112 is pivotally secured to the gear box 64 by a pin 113 for this purpose. A stud 114 extends through the clamp dog 112 and engages the gear box 64 so that when the stud is tightened, a curved free end 115 of the dog frictionally engages with the shaft 103 to prevent it from turning. Loosening the stud 114 permits the shaft 103 and dials to be turned to set the measuring device.

It should be noted that the dials 106 and 109 and hence the setting of the machine can be changed when the machine is in operation and that no parts can be jammed or injured by such resetting. Also, the dial 106 is adjustably held on the shaft 70 by a clamping stud 106a so that the machine can be accurately calibrated both initially and as wear occurs.

Another desirable feature of the invention is that the present device can be actuated at any desired time by hand. For this purpose, lever 116 connects to a link 117 that is pivotally supported intermediate its ends by a pin 118 that is secured to the block 81. The link 117 then is designed to move the latch hook 78 out of engagement with the clutch tripping latch 82 when the end of the lever 116, extending out beyond the gear box, is pulled outwardly.

The reset rod 86 can be depressed in any suitable manner so as to prepare it for another operational cycle. To this end, there is shown, somewhat diagrammatically in Fig. 1, a chain 120 that is suitably mounted on sprockets 130 and 131 that are carried by shafts 132 and 133 with the shaft 132 being suitably connected to and driven by the shaft 63 through the chain 77. This chain 120 has a fixed orbit and is used to perform the action desired in the machine when the input movement has accumulated sufficiently as to actuate the machine. The chain 120 has a roller 134 secured thereto so that it moves with the chain as the chain is driven. The roller 134 is adapted to strike an arm 122 that is associated with the reset rod 86 to return it to its clutch disengaging position whereby the output action of the machine will be terminated and it will be ready for another cycle of motion accumulation and resultant actuation. The reset rod 86 resetting also returns the clutch tripping latch 82 and dog 89 to their clutch disengaging positions, all as disclosed in detail in my application Serial No. 709,578 filed concurrently herewith on an Automatic Functional Device.

It should be noted that the gear nut 69 and associated means cannot cause the machine to operate on extremely small input movements since it takes an instant to reset the apparatus on each actuation thereof.

It has been previously indicated that the machine disclosed in detail herein is but one example of the principles of my invention and the machine could operate in conjunction with a conveyor, or other continuous, continually moving articles such as pipe or rod as it is formed in a continuous forming machine, and any of a number of operations, such as pushing, pulling, cutting, notching, embossing, printing, etc., could be performed on such articles or on means associated therewith at any desired predetermined intervals. That is, the machine will measure input motion on the shaft 70 and will, at a predetermined time with relation to the movement of the input member, actuate the lock means 72 so as to connect the clutch 73 between a suitable driven member (hub bushing 62) and the output shaft 63. This shaft then is used to perform the desired operation at the proper instant. The machine is also arranged so that it resets itself while the output shaft is performing the desired actuation of the machine.

Thus the measuring and actuating machine of the invention is adapted for cyclic operation, with the actuating action being controlled so as to occur on accumulation of a predetermined amount of input motion, which input may be either irregular or regular in nature.

While in accord with the patent statutes, I have specifically illustrated and described one embodiment of my invention, it should be particularly understood that I am not to be limited thereto or thereby, but that the scope of my invention is defined in the appended claims.

What is claimed is:

1. A measuring and actuating device comprising a cover box, a clutch shaft journalled in said cover box, a gear journalled on said clutch shaft and adapted to engage with a member the motion of which is to be measured, a pinion shaft having a gear formed along substantially the entire length thereof, said pinion shaft being journalled in said cover box, means connecting said gear on said clutch shaft to said pinion shaft to rotate it whenever the member is putting motion into the device, a threaded shaft journalled in said cover box, a gear nut engaged with said threaded shaft and with said gear on said pinion shaft, said gear nut being adapted to be moved along said threaded shaft as it is rotated by said gear on said pinion shaft, a clutch carried by said clutch shaft and adapted to engage it with said gear journalled thereon, control means for engaging and releasing said clutch, said control means being actuated by said gear nut to engage said clutch as said gear nut is moved to a predetermined axial position along the axis of said threaded shaft, output means associated with said clutch shaft to be driven thereby, a reset stop member for said gear nut, means adjustably associating said stop member with said threaded shaft, means for resetting said gear nut to its starting position, and means for automatically actuating said control means to release said clutch upon completion of an operational cycle of said output means.

2. A measuring and actuating device comprising a cover box, an output shaft journalled in said cover box, an input member, a pinion shaft having a gear formed along substantially the entire length thereof, said pinion shaft being journalled in said cover box and being engaged with and driven by said input member to be rotated whenever said member is putting motion into the device, a threaded shaft journalled in said cover box, a gear nut engaged with said threaded shaft and with said gear on said pinion shaft, said gear nut being adapted to be moved along said threaded shaft as it is rotated by said gear on said pinion shaft, a clutch carried by said output shaft to engage it with said input member, control means for engaging and releasing said clutch, said last-named means being actuated by said gear nut to engage said clutch as said gear nut is moved to a predetermined place along the axis of said threaded shaft, means for defining a zero position of said gear nut on said threaded shaft, means for resetting said gear nut to its zero position after it has actuated said clutch means, and means for automatically actuating said control means to release said clutch upon completion of a predetermined movement of said output shaft.

3. A measuring and actuating device comprising a cover box, an input member, a pinion shaft having a gear formed along substantially the entire length thereof, said pinion shaft being journalled in said cover box and being engaged with and driven by said input member to be rotated whenever said member is putting motion into the device, a threaded shaft journalled in said cover box, a gear nut engaged with said threaded shaft and with said gear on said pinion shaft, said gear nut being adapted to be moved along said threaded shaft as it is rotated by said gear on said pinion shaft, an output member, a clutch for connecting said input and output members, control means for engaging and releasing said clutch, said control means being actuated by said gear nut to engage said clutch as said gear nut is moved to a predetermined place along the axis of said threaded shaft, and means associated with said output member for actuating said control means to release said clutch.

4. A cyclic measuring and operational device comprising a rotatable input member, movable means for measuring movement of said input member, an output member, a driven member, clutch means adapted to engage said output member and said driven member, the engagement of said clutch means being controlled by said movable means, resetting means for setting said movable means at its zero position, means for actuating said resetting means when said clutch is engaged, means for disengaging said clutch means, and means for actuating said disengaging means when said output member is moved a predetermined distance.

5. A cyclic measuring and operational device comprising means for measuring movement of an input member, means for defining a starting position for said first named means, and output member, a driven member, clutch means adapted to engage said output and driven members, means actuated by said first named means for engaging said clutch means and for disengaging said clutch means when said output member has been driven a predetermined amount, and means for resetting said first-named means against said second named means.

6. A cyclic measuring and operational device comprising an input member, means for measuring movement of said input member, an output member, clutch means adapted to be engaged with said output member, a driven member carrying said clutch means, the engagement of said clutch means being controlled by said first-named means, means for setting said first named means at its zero position, and means for disengaging said clutch means.

7. In a cyclic measuring and operational device, cyclic means for measuring movement to be measured and including a gear in threaded engagement with a shaft, an output shaft, a driven member, clutch means adapted to engage said output shaft and said driven member, the engagement of said clutch means being controlled by said cyclic means carried by said output shaft and associated with the said shaft of said cyclic means, and means for resetting said cyclic means.

8. In a cyclic measuring device, a threaded measuring shaft, measuring means threadedly engaged with said shaft and movable axially therealong for recording movement thereon, stop means for limiting the starting position of said measuring means, driven input means engaged with said measuring means, an output shaft, means for driving said output shaft when said measuring means are moved to a predetermined position on said measuring shaft, a large diameter gear journalled on said output shaft, clutch means secured to said output shaft for engaging with said gear and driving it on rotation of said output shaft, and a small diameter gear secured to said measuring shaft and engaged with said large diameter gear, said large gear being adapted to drive said measuring shaft oppositely and much faster than said input means drives said measuring means so that a retraction movement of said measuring means occurs until said measuring means strike said stop means whereupon said clutch means slip sufficiently so as to retain said measuring means slightly pressed against said stop means as long as said output shaft is rotating.

9. In a cyclic measuring device, a threaded measuring shaft, measuring means threadedly engaged with said shaft and movable therealong for recording movement thereon, stop means for defining the starting position of said measuring means, input means engaged with said measuring means for rotating it to move it along said shaft, an output shaft, a drive member, means controlled by said measuring means for engaging said output shaft to said drive member, gear means connecting said output shaft to said measuring shaft, and clutch means associated with said gear means for permitting slippage therein under greater than a predetermined pressure, said gear means being adapted to drive said measuring shaft so that an axial retraction movement of said measuring means occurs until said measuring means strike said stop means whereupon said clutch means slip sufficiently so as to retain said measuring means slightly pressed against said stop means as long as said output shaft is rotating.

10. In a cyclic measuring device, a threaded measuring shaft, a gear nut threadedly engaged with said shaft and movable therealong for recording movement thereon, stop means for limiting the starting position of said gear nut, input means engaged with said gear nut for rotating it to move it axially of said shaft in proportion to the relative movement of said input means, an output shaft, means for driving said output shaft when said gear nut is at a predetermined position axially of said shaft, a gear rotatably journalled on said output shaft, clutch means secured to said output shaft for engaging with said gear and releasably driving it on rotation of said output shaft, and a gear secured to said measuring shaft and engaged with said gear on said output shaft, said gears being adapted to drive said measuring shaft so as to retract said gear nut until it strikes said stop means whereupon said clutch means slip sufficiently so as to retain said gear nut slightly pressed against said stop means as long as said output shaft is rotating.

11. In a measuring device, a measuring shaft, means movable along said measuring shaft for recording a measured movement, a stop member associated with said measuring shaft for limiting the movement of said movable means, a threaded shaft engaging with and positioning said stop member for movement along the longitudinal axis of said measuring shaft, and means secured to said threaded shaft for indicating the position thereof whereby the position of said stop member can be set by the position of said threaded shaft.

12. In a measuring device, a measuring shaft, means movable along said measuring shaft for recording a measured movement, a stop member associated with said measuring shaft for limiting the movement of said movable means, a threaded shaft engaging with and positioning said stop member for movement along the longitudinal axis of said measuring shaft, an indicator dial secured to said threaded shaft for indicating the arcuate position thereof, a second indicator dial for recording revolutions of said threaded shaft, and means connecting said dials together for actuation of said second dial through one step of its rotation upon one rotation of said first dial.

13. In a measuring device, a measuring shaft, means movable along said measuring shaft for recording a measured movement, a stop member associated with said measuring shaft for limiting the movement of said movable means, a threaded shaft engaging with and positioning said stop member for movement along the longitudinal axis of such shaft and thereby along said measuring shaft, an indicator dial secured to said threaded shaft for indicating the arcuate position thereof, a second indicator dial for recording revolutions of said threaded shaft, means connecting said dials together for actuation of said second dial through one step of its rotation upon one rotation of said first dial, and releasable means for locking said threaded shaft in a given position whereby said stop member can be positioned in any desired location and be retained there on operation of the device.

14. In a measuring device having a measuring shaft, a stop member associated with and encompassing the measuring shaft for defining the extent of input motion measured thereby, means including a second shaft parallel to said measuring shaft engaging with and positioning said stop member for movement along the longitudinal axis of the measuring shaft, and indicator means directly connected to said second shaft for indicating the position of said stop member at all times with relation to the length of the measuring shaft and means provided for locking said indicator means in a given position.

15. A combination as in claim 7 wherein a manual control is provided to engage said clutch means at any desired time.

16. A device as in claim 4 wherein means are provided for controlling the amount of movement which can be recorded on said movable means.

17. In a cyclic measuring and operational device, means for recording input movement, a driven member, an output member, a clutch adapted to connect said members when it is engaged, a clutch lock adapted to retain said clutch normally in a disengaged position, said clutch lock being adapted to be tripped by said means on predetermined movement thereof, and means associated with said driven member for resetting said clutch lock, said last mentioned means including a lever actuated by said driven member on predetermined movement thereof and connected to said clutch lock.

18. In a cyclic measuring and operational device, means for recording input movement, a driven member, an output member, a clutch adapted to connect said members when it is engaged, and a clutch lock adapted to retain said clutch normally in a disengaged position, said clutch lock being adapted to be tripped by said means on predetermined movement thereof, said means including a gear nut in threaded engagement with a shaft and a pinion shaft engaged with said gear nut and driven by said driven member.

19. In a cyclic measuring and operational device, means for recording input movement, a driven member, an output member, a clutch adapted to connect said members when it is engaged, said means being adapted to measure input movement by being driven through a predetermined path, a latch hook pivotally positioned in the path of said means and adapted to be moved thereby, a clutch tripping latch associated with said latch hook and adapted to be tripped by movement of said latch hook by said means, means associated with said clutch tripping latch for engaging said clutch when said clutch tripping latch is tripped, means for disengaging said clutch and resetting said clutch tripping latch, and means for resetting said latch hook.

20. A device as in claim 18 wherein a spring member is associated with said clutch lock to resist tripping thereof until all of the slack in the device is overcome.

21. In a cyclic measuring and operational device, a threaded shaft, a tapped gear nut engageable with said measuring shaft, a clutch, a clutch control member positioned adjacent said measuring shaft for actuation by said nut when moved to a predetermined position on said measuring shaft, and a driven pinion shaft positioned parallel to said measuring shaft to engage with said gear nut for rotating same to move it along said measuring shaft in accordance with the rotary movement of said driven pinion shaft, an output shaft, a gear journalled on said output shaft, a slip clutch provided between said output shaft and said gear, and a second gear secured to said measuring shaft and meshed with said gear on said output shaft for rotating said measuring shaft for moving said gear nut towards its starting position when said output shaft is rotated, said pinion shaft being continuously driven, said gear on said output shaft being a relatively large gear and said second gear a relatively small gear, and said gears driving said measuring shaft in the same direction as said gear nut is driven but at a more rapid rotational speed.

22. In a cyclic measuring and operational device, a threaded measuring shaft, a tapped gear nut engageable with said measuring shaft, a clutch, a clutch control member positioned adjacent said measuring shaft for actuation by said nut when moved to a predetermined position on said measuring shaft, a driven pinion shaft positioned parallel to said measuring shaft to engage with said gear nut for rotating same to move it along said measuring shaft in accordance with the rotary movement of said driven pinion shaft, an output shaft, a gear journalled on said output shaft, a slip clutch connected between said output shaft and said gear, and a second gear is secured to said measuring shaft and meshed with said gear on said output shaft for rotating said measuring shaft for moving said gear nut towards its starting position when said output shaft is rotated.

VALONE C. V. WEYANT.

REFERENCES CITED

The following references are of record in the file of this patent:

UNITED STATES PATENTS

| Number | Name | Date |
|---|---|---|
| 962,762 | Iverson | June 28, 1910 |
| 968,303 | Winkler | Aug. 23, 1910 |
| 1,242,260 | Stone | Oct. 9, 1917 |
| 1,327,303 | Bendix | Jan. 6, 1920 |
| 1,340,811 | Ballman | May 18, 1920 |
| 1,413,982 | Gill | Apr. 25, 1922 |
| 1,957,901 | Nehls | May 8, 1934 |
| 2,097,933 | McPherren | Nov. 2, 1937 |
| 2,183,361 | Swanson | Dec. 12, 1939 |
| 2,296,061 | Schwarz | Sept. 15, 1942 |
| 2,346,172 | Lennon et al. | Apr. 11, 1944 |

FOREIGN PATENTS

| Number | Country | Date |
|---|---|---|
| 139,930 | Germany | Mar. 21, 1903 |
| 252,093 | Great Britain | May 20, 1926 |
| 33,861 | France | Aug. 28, 1928 |
| 829,666 | France | Apr. 19, 1938 |